United States Patent
Ehinger et al.

(10) Patent No.: US 8,398,305 B2
(45) Date of Patent: Mar. 19, 2013

(54) THERMOMETER HAVING AN EXCHANGEABLE MEASUREMENT INSERT, AND METHOD FOR REPLACING THE LATTER

(75) Inventors: Karl Ehinger, Karlstein (DE); Klaus-Jürgen Zeiger, Lich (DE); Harald U. Müller, Fulda (DE); Ralf Huck, Großkrotzenburg (DE)

(73) Assignee: ABB AG, Mannheim (DE)

( * ) Notice: Subject to any disclaimer, the term of this patent is extended or adjusted under 35 U.S.C. 154(b) by 1183 days.

(21) Appl. No.: 12/182,748

(22) Filed: Jul. 30, 2008

(65) Prior Publication Data
US 2009/0034584 A1 Feb. 5, 2009

(30) Foreign Application Priority Data
Aug. 3, 2007 (DE) .................. 10 2007 036 693

(51) Int. Cl.
*G01K 1/00* (2006.01)
(52) U.S. Cl. .................. 374/208; 374/100
(58) Field of Classification Search ............. 374/208, 374/156, 100, 139, 147, 163, 179; 136/234; 266/274; 338/28, 30
See application file for complete search history.

(56) References Cited

U.S. PATENT DOCUMENTS

| | | | | |
|---|---|---|---|---|
| 2,343,242 A | * | 3/1944 | Richmond | 136/242 |
| 2,465,981 A | * | 3/1949 | Robertson | 338/28 |
| 2,546,415 A | * | 3/1951 | Alcock | 60/233 |
| 2,672,493 A | * | 3/1954 | Tingle et al. | 136/234 |
| 3,167,733 A | * | 1/1965 | Di Noia | 338/28 |
| 3,246,521 A | * | 4/1966 | Humphrey | 374/148 |
| 3,308,666 A | * | 3/1967 | Anderson et al. | 338/28 |
| 3,343,589 A | * | 9/1967 | Holzl | 164/46 |

(Continued)

FOREIGN PATENT DOCUMENTS

| | | |
|---|---|---|
| DE | 23 21 713 | 10/1983 |
| DE | 91 08 581 U1 | 1/1992 |

(Continued)

OTHER PUBLICATIONS

Office Action issued in DE 10 2007 036 693.2-52 dated Sep. 10, 2009.

*Primary Examiner* — Peter Macchiarolo
*Assistant Examiner* — Tania Courson
(74) *Attorney, Agent, or Firm* — Buchanan Ingersoll & Rooney PC

(57) ABSTRACT

The disclosure relates to a thermometer having an exchangeable measurement insert for measuring process temperatures of liquid or gaseous media in vessels of process installations, and to a method for replacing the measurement insert. On the basis of a thermometer in which the measurement insert is accommodated, such that it can be changed, in a protective tube which is closed at one end and has a process flange, the closed end of the protective tube being immersed, as far as the process flange, in a container in which the medium whose temperature is to be determined is situated, and the open end of the protective tube being guided at least indirectly to a connection housing in which at least connection terminals for connecting the measurement insert to a remote measured value processing system are arranged, provision is made for the transition from the open end of the protective tube to the connection housing to have a clearance fit with a cylindrical fitting surface between the measurement insert and a fitting sleeve which at least partially surrounds the latter.

17 Claims, 5 Drawing Sheets

U.S. PATENT DOCUMENTS

| | | | | |
|---|---|---|---|---|
| 3,377,862 | A | * | 4/1968 | Gheorghiu .................... 374/165 |
| 3,500,280 | A | * | 3/1970 | Ensign ............................ 338/28 |
| 3,872,728 | A | * | 3/1975 | Joyce et al. .................... 374/170 |
| 3,923,552 | A | * | 12/1975 | Parris ............................ 136/234 |
| 3,960,604 | A | * | 6/1976 | Heitzinger et al. ........... 136/233 |
| 4,001,758 | A | * | 1/1977 | Esper et al. .................... 338/34 |
| 4,112,762 | A | * | 9/1978 | Turner et al. .................. 206/306 |
| 4,165,995 | A | * | 8/1979 | Kolb ............................. 136/234 |
| 4,692,556 | A | * | 9/1987 | Bollen et al. .................. 136/234 |
| 4,721,533 | A | * | 1/1988 | Phillippi et al. ............. 136/234 |
| 4,848,927 | A | * | 7/1989 | Daily et al. ................... 374/208 |
| 4,850,717 | A | * | 7/1989 | Clark et al. ................... 374/208 |
| 5,131,759 | A | * | 7/1992 | Eiermann et al. ............. 374/208 |
| 6,127,915 | A | * | 10/2000 | Gam et al. ....................... 338/28 |
| 6,352,361 | B1 | * | 3/2002 | Nimberger et al. ........... 374/142 |
| 6,679,627 | B1 | * | 1/2004 | Allaire .......................... 374/156 |
| 7,988,355 | B2 | * | 8/2011 | Gierer ........................... 374/208 |
| 8,043,001 | B2 | * | 10/2011 | Umkehrer ..................... 374/185 |
| 2009/0147826 | A1 | * | 6/2009 | Suzuki et al. ................. 374/208 |

FOREIGN PATENT DOCUMENTS

| | | |
|---|---|---|
| DE | 20 2007 010 843 U1 | 11/2007 |
| EP | 0 291 571 A1 | 11/1988 |

* cited by examiner

THERMOMETER HAVING AN EXCHANGEABLE MEASUREMENT INSERT, AND METHOD FOR REPLACING THE LATTER

RELATED APPLICATION

This application claims priority under 35 U.S.C. §119 to German Patent Application No. 10 2007 036 693.2 filed in Germany on Aug. 3, 2007, the entire content of which is hereby incorporated by reference in its entirety.

TECHNICAL FIELD

The disclosure relates to a thermometer having an exchangeable measurement insert for measuring process temperatures of liquid or gaseous media in vessels of process installations, and to a method for replacing the measurement insert.

BACKGROUND INFORMATION

Such thermometer arrangements have been known for a long time and are described, for example, in EP 0 291 571 A1. Such a thermometer essentially comprises a measurement insert which is accommodated in a protective tube which is closed at one end and has a process flange, the closed end of the protective tube being immersed, as far as the process flange, in a container in which the medium whose temperature is to be determined is situated. The open end of the protective tube is guided into a connection housing in which at least connection terminals for connecting the measurement insert to a remote measured value processing system via a communication line are arranged. In addition, an electrical circuit for preprocessing measured values may be arranged in the connection housing.

The fundamental components of the thermometer arrangement are standardized in order to ensure that they can be replaced; the connection heads are thus standardized in DIN 43729 and the protective tubes are standardized in DIN 43772. In addition, thermometers having an exchangeable measurement insert are standardized in DIN 43770 and DIN 43771 and thermocouples, in particular, are standardized in DIN 43733.

The protective tube is composed of an abrasion-resistant and/or corrosion-resistant material and protects the measurement insert from attack by aggressive media. Protective tubes which are drilled from solid material and whose outer contours are machined are preferably used for high loads. This has the advantage that the mass, shape and wall thicknesses can be optimally adapted to the operating loads, such as pressure and flow, and to the metrological requirements, such as response time. However, protective tubes produced in this manner are complicated to produce and are accordingly expensive. For this reason, drilled protective tubes are used only for that area of the temperature sensor which comes into contact with the medium. Thermometers are extended with so-called neck tubes, if required, outside the area of the medium.

Depending on the field of application, the protective tubes are subject to particular legal requirements. In the form of pressure-bearing parts, for example, the material, design, calculation, production and testing must meet the requirements of the pressure vessel or steam boiler decree. The corresponding rules and regulations of country-specific codes, for example ASME codes, are also internationally widespread. In areas subject to explosion hazards, protective tubes are used to separate zones with different hazard frequencies.

Electrical devices inside areas subject to explosion hazards and associated operating means outside areas subject to explosion hazards must conform to EU Guideline 94/9/EC. An office nominated by the EU Member States checks compliance with the relevant standards and carries out requisite tests. Conformity is certified with an EC design test certificate or, for simple electrical operating means, including thermocouples, for example, according to point 5.4 of EN 50020, by means of a manufacturer's declaration of conformity. In addition, manufacturers must subject the production of these devices to a regular inspection audit by a nominated office.

The intended use of the devices and the associated operating means is a basic prerequisite for explosion protection. In addition to the special requirements for planning, selecting and erecting electrical installations in areas subject to explosion hazards, the manufacturer's information, including the EC design test certificate, labeling on the device and the associated operating instructions must be heeded in this respect.

The process of designing a temperature sensor for applications in the explosion-proof area has measures for avoiding explosions. These include, in particular, the intrinsically safe design of the circuits and/or pressure-resistant encapsulation of the measuring transducers in the connection head.

Since the known embodiments of industrial temperature sensors cannot rule out the entrance of an explosive gas mixture into the interior of the protective tube, the temperature range in which they are used must be limited to the temperature class of the gas mixture which is possibly in the surrounding area and thus also in the interior of the protective tube and/or in the process. Corresponding details on the labels make this clear by means of the maximum temperature of the medium Tmed, which depends on the temperature class T1 . . . T6. In this case, the temperature class indicates the maximum permissible surface temperature at which it can still be assumed, taking into account safety margins, that the gas will not ignite. If the temperature class of the medium and the temperature class of the surrounding area are identical, this situation constitutes virtually no restriction at all since it is not physically expedient to aim for measurement temperatures above the temperature class of the medium.

If, however, the temperature class of the medium were, in principle, to allow a higher measurement temperature than would result from the temperature class of the surrounding area, because, for example, a gas mixture with a higher ignition temperature or a gas which is not explosive at all is present in the process and/or because the interior of the protective tube is brought to a higher temperature as a result of intrinsic heating of the sensor, the theoretically (physically) possible measurement range would be restricted in an undesirable manner on account of the situation described above.

Despite a large amount of resistance, it is not possible to preclude damage to the protective tube. As a result of such damage, the medium advances through the interior of the protective tube into the connection housing and attacks the components of the electronic circuit and of the measurement insert and the insulation of the communication line.

The utility model DE 91 08 581 U1 discloses that an electrical measurement bushing, which is composed of a bushing body having an integrated collar made from fluorocarbon resin, is provided in order to seal the interior of the thermometer with respect to the outside world. The collar is arranged between flanges of the measuring tube and of the connection housing. In this case, the collar seals the interior of the measuring tube with respect to the connection housing and the outside world. However, the multipart construction is very complicated and makes it difficult to exchange the measurement insert.

SUMMARY

Means are disclosed for the known thermometer arrangement which are suitable for using the physically possible measurement range with the ability to replace the measurement insert as desired.

A thermometer having an exchangeable measurement insert is disclosed which is accommodated, such that it can be changed, in a protective tube which is closed at one end and has a process flange, the closed end of the protective tube being immersed, as far as the process flange, in a container in which the medium whose temperature is to be determined is situated, and the open end of the protective tube being guided at least indirectly to a connection housing in which at least connection terminals for connecting the measurement insert to a remote measured value processing system are arranged, wherein the transition from the open end of the protective tube to the connection housing has a clearance fit with a cylindrical fitting surface between the measurement insert and a fitting sleeve which at least partially surrounds the latter.

In another aspect, a method is disclosed for exchanging the measurement insert in a thermometer having an exchangeable measurement insert which is accommodated, such that it can be changed, in a protective tube which is closed at one end and has a process flange, the closed end of the protective tube being immersed, as far as the process flange, in a container in which the medium whose temperature is to be determined is situated, and an open end of the protective tube being guided at least indirectly to a connection housing in which at least connection terminals for connecting the measurement insert to a remote measured value processing system are arranged. The method comprises: flushing the volume between a fitting sleeve and the closed end of the protective tube with a non-explosive gas; beginning the removal of the measurement insert; and continuously flushing the volume between a fitting sleeve and the closed end of the protective tube with a non-explosive gas until the new measurement insert has been completely installed, wherein the transition from the open end of the protective tube to the connection housing has a clearance fit with a cylindrical fitting surface between the measurement insert and the fitting sleeve.

BRIEF DESCRIPTION OF THE DRAWINGS

Further details and advantages of the disclosure are explained in more detail below using exemplary embodiments. In the requisite drawings.

DETAILED DESCRIPTION

Figure 1A:
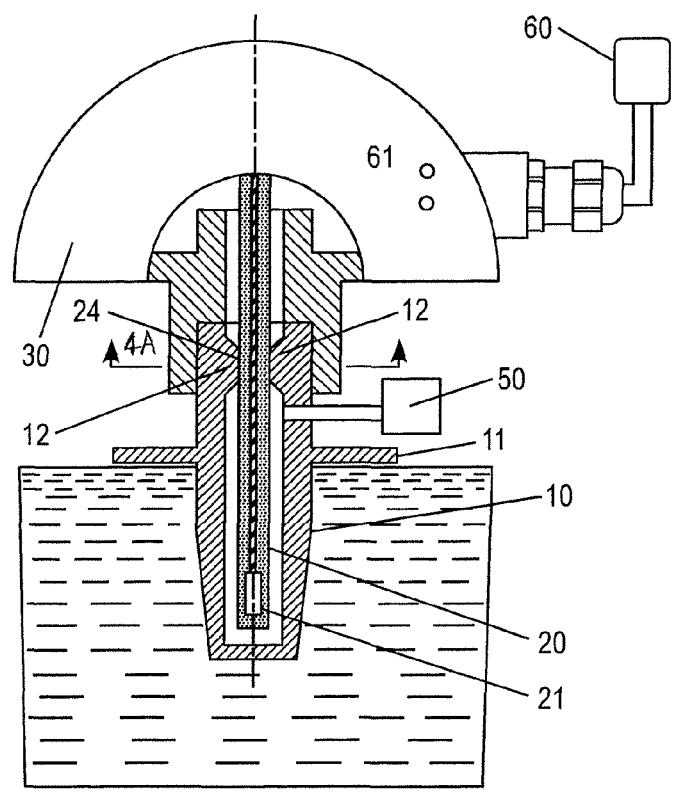
FIGS. 1A and 1B each show a partially sectioned basic illustration of an exemplary thermometer arrangement having a fitting sleeve on the protective tube.

The disclosure is based on a thermometer essentially comprising a measurement insert which is accommodated, such that it can be changed, in a protective tube which is closed at one end and has a process flange, the closed end of the protective tube being immersed, as far as the process flange, in a container in which the medium whose temperature is to be determined is situated, and the open end of the protective tube being guided at least indirectly to a connection housing in which at least connection terminals for connecting the measurement insert to a remote measured value processing system are arranged.

According to the disclosure, the transition from the open end of the protective tube to the connection housing has a clearance fit 24 with a cylindrical fitting surface between the measurement insert and a fitting sleeve which at least partially surrounds the latter.

When the measurement insert has been inserted and during intended use of the thermometer, the clearance fit 24 forms, with the cylindrical fitting surface, an elongate annular gap which allows the gas to be exchanged between the volumes on both sides of the clearance fit but prevents the passage of flames.

Insofar as an explosive atmosphere which enters through the annular gap is ignited on the hot surface of the measurement insert, the effect of the ignition remains locally limited to the interior of the protective tube.

Insofar as an explosive mixture is formed in the interior of the protective tube from the medium in the process vessel and the atmosphere in the protective tube as a result of damage to the protective tube, which mixture is ignited on the hot surface of the measurement insert, the effect of the ignition remains locally limited to the interior of the protective tube in this case too.

The profile along the temperature gradient of a protective tube falls continuously from the temperature of the medium $T_{Med}$ at the tip to the temperature $T_P$ at the process connection. The outer side of the process connection faces the medium surrounding the process. This surface temperature $T_P$ must therefore be considered to be a possible source of ignition. According to the disclosure, those surfaces inside the protective tube which are above this temperature $T_P$ are partitioned off from the colder areas of the protective tube which are below $T_P$, with the result that there is no danger from a possible explosion in the hotter areas inside the protective tube. Since, in the case of such a design, there is now no longer any risk from the temperature range between the temperatures $T_P$ and $T_{Med}$, which is optionally additionally increased as a result of intrinsic heating of the sensor, only the lower temperature $T_P$ is now decisive for the temperature class. Given the same temperature class and the same temperature $T_P$, considerably higher measurement temperatures $T_{Med}$ are thus permissible.

Whereas the known thermometer is described by the relationship $$TK_{Med} > T_{Med} = (TK_U - T_{EW}),$$

where $TK_{Med}$: temperature class of the medium
$T_{Med}$: temperature of the medium
$TK_U$: temperature class of the surrounding area
$T_{EW}$: temperature of intrinsic heating, the following applies to the thermometer designed according to the disclosure, with the same symbols:

$$TK_{Med} = T_{Med} > (TK_U - T_{EW})$$

Therefore, the range in which the thermometer is used is independent of intrinsic heating.

In this case, the gas volume is advantageously included inside the protective tube with the ability, at the same time, to exchange the measurement insert in a simple manner.

According to another feature of the disclosure, the open end of the protective tube is in the form of a fitting sleeve. The volume around the intrinsically heated sensor is advantageously enclosed by a single-part component, with the result that additional joining locations are disregarded.

According to another feature of the disclosure, the fitting sleeve is inserted into the open end of the protective tube. Sensors which have already been installed can be advantageously enhanced according to the disclosure in this manner without interrupting the process.

According to another feature of the disclosure, the connection housing has an opening for the passage of the exchangeable measurement insert, said opening being in the form of a fitting sleeve. Sensors which have already been installed can be advantageously enhanced according to the disclosure by replacing the connection housing without interrupting the process.

According to another feature of the disclosure, the connection housing has an opening for the passage of the exchangeable measurement insert, the fitting sleeve being inserted into said opening. Existing connection housings of sensors which have already been installed can thus be enhanced according to the disclosure in a simple manner without replacing the connection housing and without interrupting the process.

According to another feature of the disclosure, the connection housing is connected to the open end of the protective tube with the interposition of a neck tube, and the neck tube is at least partially in the form of a fitting sleeve. Neck tubes are used to extend protective tubes outside the container which carries the medium. These neck tubes are particularly suitable for subsequently enhancing sensors, which have already been installed, according to the disclosure. In this case, the existing neck tube is replaced in a simple manner with a neck tube which is at least partially in the form of a fitting sleeve.

According to another feature of the disclosure, the connection housing is connected to the open end of the protective tube with the interposition of a neck tube, and the fitting sleeve is inserted into the neck tube. In this case, the existing neck tube is supplemented by inserting the fitting sleeve and a sensor which has already been installed is subsequently enhanced according to the disclosure in this manner. Any changes to the protective tube can be advantageously dispensed with in this case.

In order to exchange the measurement insert, another feature of the disclosure provides for the volume between the fitting sleeve and the closed end of the protective tube to be flushed with a non-explosive gas before the beginning of the removal of the measurement insert and then continuously until the new measurement insert has been completely installed. The penetration of explosive gas from the surrounding area is thus reliably prevented. This advantageously makes it possible to exchange the measurement insert even under potentially explosive conditions.

Figure 1B:
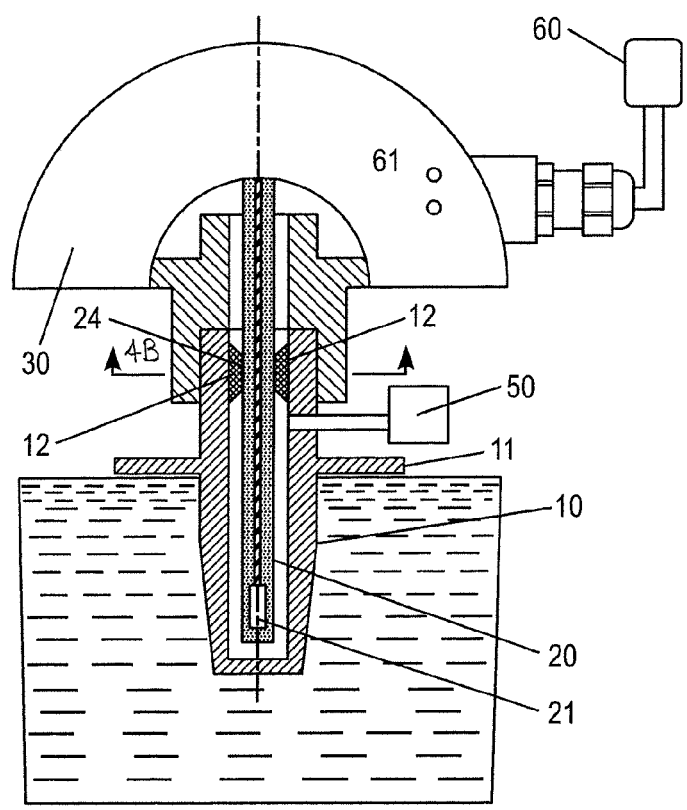

FIGS. 1A and 1B each show a partially sectioned illustration of an exemplary thermometer arrangement for measuring process temperatures of liquid or gaseous media in vessels of process installations. The thermometer arrangement has a protective tube 10 which accommodates a measurement insert 20 having a temperature sensor 21. The protective tube 10 is closed at the end on the sensor side and has a process flange 11, as far as which the closed end of the protective tube 10 is immersed in a vessel (not illustrated) of a process installation. The open end of the protective tube 10 is connected to a connection housing 30. The connection housing includes connection terminals 61 for connecting the measurement insert 20 to a remote measured value processing system 60.

The transition from the open end of the protective tube 10 to the connection housing 30 has a clearance fit having a cylindrical fitting surface between the measurement insert 20 and a fitting sleeve 12 which at least partially surrounds the latter.

In a first exemplary embodiment, according to FIG. 1A, the open end of the protective tube 10 is in the form of a fitting sleeve 12. The fitting sleeve 12 is thus an integral part of the protective tube 10.

In a second exemplary embodiment, according to FIG. 1B, the fitting sleeve 12 is inserted, as a separate component, into the open end of the protective tube 10.

In addition, a flushing device 50 whose flushing output is flow-connected to the interior of the protective tube 10 is provided between the process flange 11 and the fitting sleeve 12.

Figure 2:
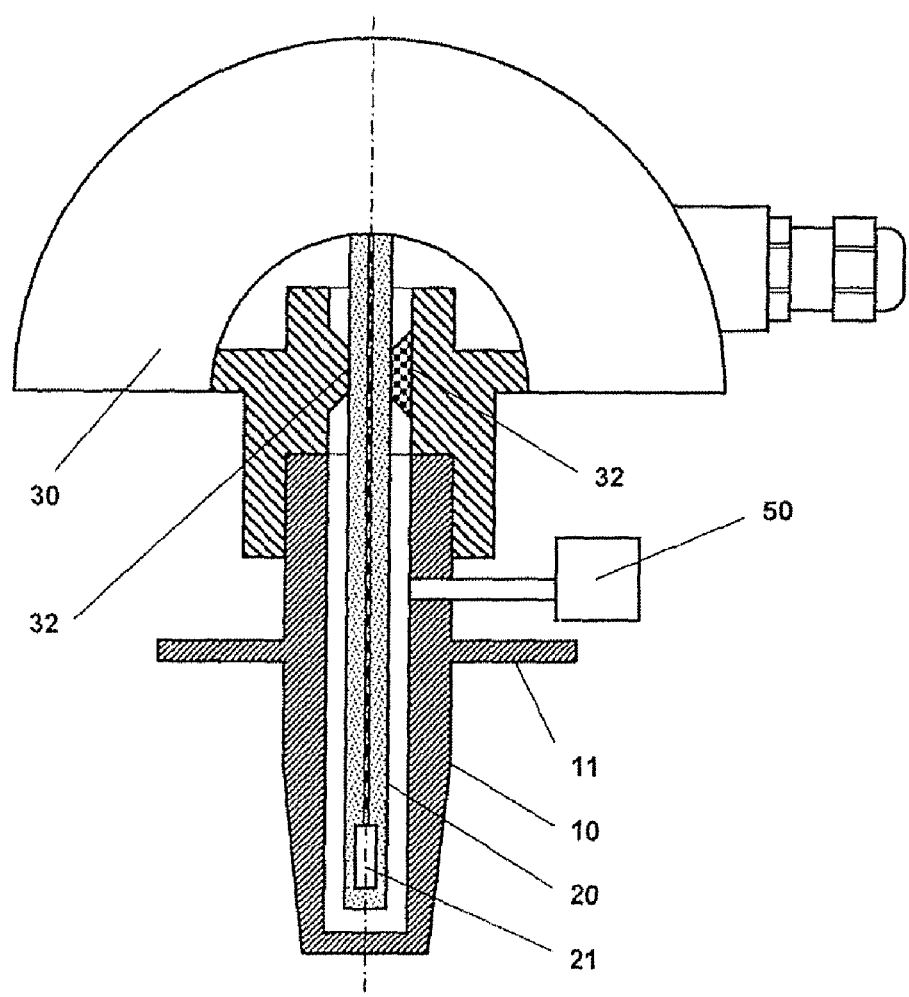
FIG. 2 shows a partially sectioned basic illustration of an exemplary thermometer arrangement having a fitting sleeve on the connection housing.

Using the same reference symbols for the same means, FIG. 2 shows a partially sectioned basic illustration of a thermometer arrangement in which the connection housing 30 has an opening for the passage of the exchangeable measurement insert 20, said opening accommodating the fitting sleeve 32.

In a third exemplary embodiment, according to the illustration to the left of the dash-dotted line in FIG. 2, the opening in the connection housing 30 is in the form of a fitting sleeve 32. The fitting sleeve 32 is thus an integral part of the connection housing 30.

In a fourth exemplary embodiment, according to the illustration to the right of the dash-dotted line in FIG. 2, the fitting sleeve 32 is inserted, as a separate component, into the opening in the connection housing 30.

Figure 3:
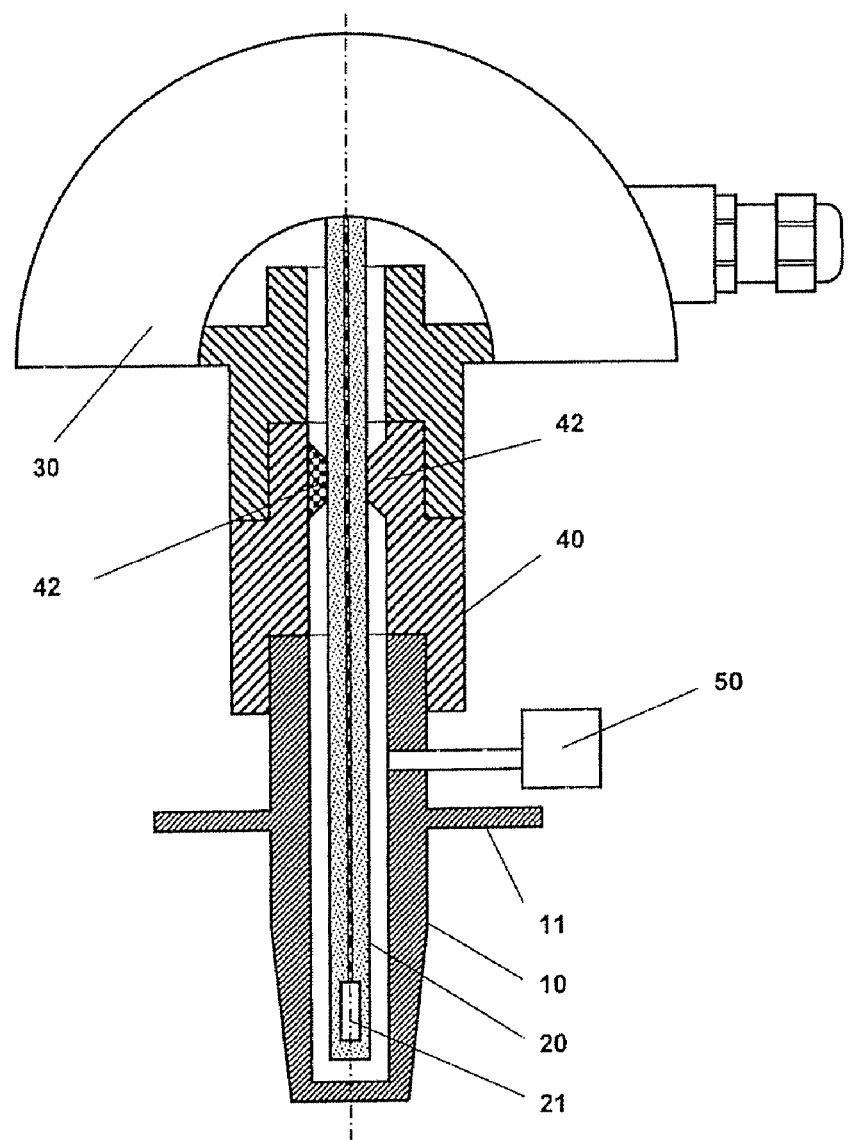
FIG. 3 shows a partially sectioned basic illustration of an exemplary thermometer arrangement having a fitting sleeve on the neck tube.
Figure 4A:
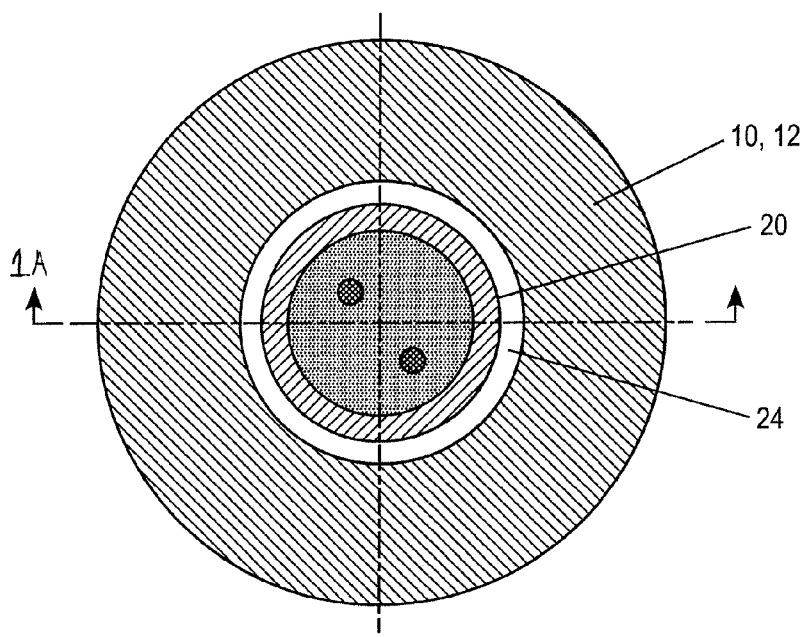
FIG. 4A is a plan view of a cross-section corresponding to FIG. 1A.
Figure 4B:
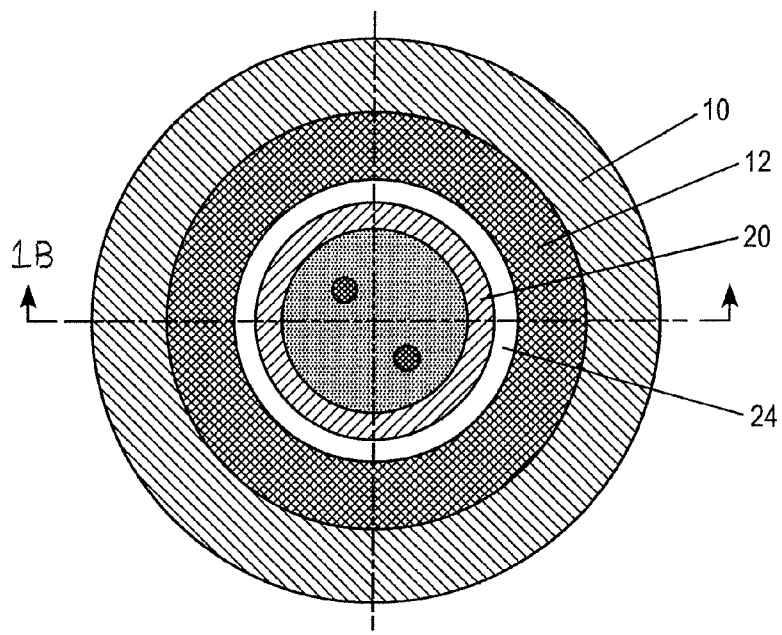
FIG. 4B is a plan view of a cross-section corresponding to FIG. 1B.

Using the same reference symbols for the same means, FIG. 3 shows a partially sectioned basic illustration of a thermometer arrangement in which a neck tube 40 which accommodates the fitting sleeve 42 is inserted between the connection housing 30 and the protective tube 10. The neck tube 40 is connected, on the one hand, to the open end of the protective tube 10 and, on the other hand, to the opening in the connection housing 30.

In a fifth exemplary embodiment, according to the illustration to the right of the dash-dotted line in FIG. 3, the neck tube 40 which has been inserted is at least partially in the form of a fitting sleeve 42. The fitting sleeve 42 is thus an integral part of the protective tube 10.

Finally, in a sixth exemplary embodiment, according to the illustration to the left of the dash-dotted line in FIG. 3, the fitting sleeve 42 is inserted, as a separate component, into the neck tube 40.

Another refinement of the disclosure provides for the fitting sleeves 12, 32 and 42 which have been inserted as a separate component to be connected to the respective accommodating machine part, protective tube 10, connection housing 30 or neck tube 40 in a cohesive fashion. In particular, provision is made for the abovementioned components to be welded to one another.

An alternative refinement of the disclosure provides for the fitting sleeves 12, 32 and 42 which have been inserted as a separate component to be connected to the respective accommodating machine part, protective tube 10, connection housing 30 or neck tube 40 in a form-fitting fashion. In particular, provision is made for the abovementioned components to be screwed to one another.

All of the exemplary embodiments described above have the feature in common that the ratio of the gap width to the gap length of the clearance fit and the ratio of the gap width to the enclosed volume between the clearance fit at the fitting sleeves 12, 32 and 42 and the closed end of the protective tube 10 respectively do not exceed predefined limit values.

Furthermore, all of the exemplary embodiments described above have the feature in common that, in order to exchange the measurement insert 20, the volume between the fitting sleeve 12, 32 and 42 and the closed end of the protective tube 10 is flushed with a non-explosive gas before the beginning of the removal of the measurement insert 20 and then continuously until the new measurement insert 20 has been completely installed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Protective tube
11 Process flange
12, 32, 42 Fitting sleeve
20 Measurement insert
21 Temperature sensor
30 Connection housing
40 Neck tube
50 Flushing device
60 Measured value processing system
61 Connection terminals

What is claimed is:

1. A thermometer, comprising:
a protective tube closed at one end and including a process flange and open end,
the closed end of the protective tube for immersion as far as the process flange, in a container in which a medium whose temperature is to be determined is situated;
an exchangeable measurement insert which is accommodated, such that it can be changed, in the protective tube;
a connection housing in which at least connection terminals for connecting the measurement insert to a remote measured value processing system are arranged, the open end of the protective tube guided to the connection housing, a transition from the open end of the protective tube to the connection housing has a clearance fit with a cylindrical fitting surface between the measurement insert and a fitting sleeve which at least partially surrounds the measurement insert; the clearance fit arranged as an annular gap for allowing gas to be exchanged between the volumes on both sides of the clearance fit.

2. The thermometer as claimed in claim 1, wherein the fitting sleeve is formed in the open end of the protective tube.

3. The thermometer as claimed in claim 1, wherein the fitting sleeve is inserted into the open end of the protective tube.

4. The thermometer as claimed in claim 1, wherein the connection housing has an opening for the passage of the exchangeable measurement insert, said opening being in the form of a fitting sleeve.

5. The thermometer as claimed in claim 1, wherein the connection housing has an opening for the passage of the exchangeable measurement insert, the fitting sleeve being inserted into said opening.

6. The thermometer as claimed in claim 1, comprising:
a neck tube, the connection housing is connected to the open end of the protective tube with the interposition of the neck tube, and the neck tube is at least partially in the form of a fitting sleeve.

7. The thermometer as claimed in claim 6, wherein the neck tube is connected to the protective tube in a cohesive fashion.

8. The thermometer as claimed in claim 6, wherein the neck tube is connected to the protective tube in a form-fitting fashion.

9. The thermometer as claimed in claim 8, wherein a ratio of a gap width to a gap length of the clearance fit and a ratio of a gap width to an enclosed volume between the clearance fit and the closed end of the protective tube respectively do not exceed predefined limit values.

10. The thermometer as claimed in claim 1, comprising:
a neck tube, the connection housing is connected to the open end of the protective tube with the interposition of the neck tube, and the fitting sleeve is inserted into the neck tube.

11. The thermometer as claimed in claim 10, wherein the neck tube is connected to the protective tube in a cohesive fashion.

12. The thermometer as claimed in claim 10, wherein the neck tube is connected to the protective tube in a form-fitting fashion.

13. The thermometer as claimed in claim 1, wherein a ratio of a gap width to a gap length of the clearance fit and a ratio of a gap width to an enclosed volume between the clearance fit and the closed end of the protective tube respectively do not exceed predefined limit values.

14. The thermometer as claimed in claim 13, comprising:
a flushing device provided between the process flange and the fitting sleeve.

15. The thermometer as claimed in claim 1, comprising:
a flushing device provided between the process flange and the fitting sleeve.

16. A method for exchanging a measurement insert in a thermometer, including a protective tube closed at one end and including a process flange and open end, the closed end of the protective tube for immersion as far as the process flange, in a container in which a medium whose temperature is to be determined is situated, an exchangeable measurement insert which is accommodated, such that it can be changed, in the protective tube, a connection housing in which at least connection terminals for connecting the measurement insert to a remote measured value processing system are arranged, the open end of the protective tube guided to the connection housing, a transition from the open end of the protective tube to the connection housing has a clearance fit with a cylindrical fitting surface between the measurement insert and a fitting sleeve which at least partially surrounds the measurement insert; the clearance fit arranged as an annular gap for allowing gas to be exchanged between the volumes on both sides of the clearance fit, the method comprising:
flushing a volume between the fitting sleeve and the closed end of the protective tube with a non-explosive gas before removal of the measurement insert and then continuously until a new measurement insert has been completely installed; and
exchanging the measurement insert.

17. A method for exchanging a measurement insert in a thermometer, including a protective tube closed at one end and including a process flange and open end, the closed end of the protective tube for immersion as far as the process flange, in a container in which a medium whose temperature is to be determined is situated, an exchangeable measurement insert which is accommodated, such that it can be changed, in the protective tube, a connection housing in which at least connection terminals for connecting the measurement insert to a remote measured value processing system are arranged, the open end of the protective tube guided to the connection housing, a transition from the open end of the protective tube to the connection housing has a clearance fit with a cylindrical fitting surface between the measurement insert and a fitting sleeve which at least partially surrounds the measurement insert; the clearance fit arranged as an annular gap for allowing gas to be exchanged between the volumes on both sides of the clearance fit, the method comprising:

flushing the volume between the fitting sleeve and the closed end of the protective tube with a non-explosive gas;

beginning the removal of the measurement insert; and continuously flushing the volume between the fitting sleeve and the closed end of the protective tube with a non-explosive gas until the new measurement insert has been completely installed.

* * * * *